Patented May 20, 1952

2,597,228

UNITED STATES PATENT OFFICE 2,597,228

METHOD OF TREATING PROTEINS WITH SATURATED ALIPHATIC POLYAMINES AND RESULTING PRODUCT

Earl D. Cornwell, Downers Grove, and Stephen Dobija, Chicago, Ill., assignors to Armour and Company, Chicago, Ill., a corporation of Illinois No Drawing. Continuation of application Serial No. 666,828, May 2, 1946. This application January 6, 1949, Serial No. 69,594

9 Claims. (Cl. 260—112)

This invention relates to a composition of matter and to the method of producing the same. The product is useful as a binder in paints, such as water-soluble paints, etc., and an adhesive or binder for paper laminations, and for a variety of other uses.

The present application constitutes a continuation of our copending application Serial No. 666,828, filed May 2, 1946, now abandoned.

An object of the invention is to provide a compound having unusual and valuable properties as a sizing or binder in paints, such as water-soluble paints, as a binder or adhesive for paper laminations, and for many other uses, the product being formed from relatively inexpensive starting materials and through the employment of a very simple process. A further object is to provide a method of producing a product through the employment of simple and inexpensive steps. Yet another object is to provide a simple method of utilizing soluble blood or fractions thereof in combination with a reacting material forming new and valuable products. Other specific objects and advantages will appear as the specification proceeds.

We have discovered that by reacting a polyamine with blood or egg proteins a highly valuable product having the uses above described may be obtained. Excellent results have been obtained through the use of ethylene diamine and blood serum in an aqueous solution, the solution being heated to a temperature in the neighborhood of 185° F. and kept under constant agitation. Upon cooling, the solution is ready for use.

A very desirable protein for use in our process is a serum fraction of animal blood. This product is commercially prepared by collecting the blood of cattle, hogs, or sheep at the slaughter house, adding an anti-clotting agent, centrifuging to separate the hemoglobin fraction from a plasma fraction, treating the plasma fraction to remove fibrin therefrom and then drying the resulting liquid serum.

Another very desirable starting material is a hemoglobin fraction obtained from animal blood as above explained, or we may start with whole blood, either liquid or in dried form.

Alternately, we may start with a protein obtained from egg, either the yolks or the whites. In fact, we may use either blood or egg or any protein-containing fraction obtained from blood or egg or any combination of such materials and fractions. The dry form of the protein material is preferred but the material may also be utilized in liquid or solution form.

All of the polyamines are satisfactory. We prefer to use ethylene diamine because it produces a more water-insoluble product in the final drying step. Very satisfactory results have been obtained with diethylene triamine, triethylene tetramine, and tetraethylene pentamine.

A specific example or formulation may be given as follows:

| | Parts |
|---|---|
| Dried blood serum | 8 |
| Water | 91.2 |
| Ethylene diamine | 0.8 |
| | 100 |

The above formula is best prepared by first dissolving the blood serum in the water, making a complete solution at room temperature (70–80° F.). Ethylene diamine is then stirred in until completely dispersed. The solution is then subjected to steam or indirect heat and kept under constant agitation until a temperature of about 185° F. has been reached. The solution is then cooled and is ready for use.

In place of ethylene diamine, as set out in the above example, we may substitute any one of the other preferred polyamines, namely, diethylene triamine, triethylene tetramine, and tetraethylene pentamine, for obtaining excellent results; and in place of the dried blood serum we may substitute any other material containing blood or egg proteins.

The above formulations all produce hard, brittle films when air-dried, but we have found that the films may be flexible through the addition of a suitable plasticizer. For example, we find that the films can be made flexible by the addition of from 20% to 50% of any one or a combination of the following plasticizers:

Glycerol
Ethylene glycol
Diethylene glycol
Triethylene glycol
Propylene glycol
Polyethylene glycol 200 (predominantly tetraethylene glycol having a molecular weight of approximately 200)
Polyethylene glycol 300 (predominantly hexaethylene glycol having a molecular weight of approximately 300)
Polyethylene glycol 400 (predominantly nonaethylene glycol having a molecular weight of approximately 400)

It will be understood that appropriate plasticizers other than those above listed may be employed, and further that the limits above given with respect to the quantity of the plasticizer used may be varied since smaller or greater percentages than those indicated will give smaller or greater degrees of flexibility.

Though it has heretofore been regarded as not possible to plasticize a blood film, we have discovered that by adding plasticizers such as those above indicated in our improved process an effective plasticized film can be obtained. We prefer to add the plasticizer to the mixture before the reaction. The resulant film formed after the reaction and after the drying of the product is substantially insoluble in water and has a very satisfactory flexibility.

While in the above specific example, we have set out certain proportions for the blood albumin and the ethylene diamine and water, it will be understood that such proportions may be varied substantially while still obtaining good results. Ordinarily, dried blood serum will contain something less than 10% solids, and the ethylene diamine is employed in the general range of around 10% of the anhydrous serum on a weight basis. The proportions will be varied in accordance with the type of result desired and in accordance with the starting materials employed.

We prefer to heat the reactants to a temperature of about 150–212° F., but the reaction will proceed though more slowly at temperatures lower than 150° and temperatures higher than 200° may be used but to no special advantage. In connection with blood serum, we have found it best to use a temperature in the neighborhood of 185° F. It will be understood that the temperature conditions may vary somewhat, particularly when other conditions are changed and the starting materials are varied. The heating may suitably be accomplished by the use of a steam bath with constant agitation of the reactants.

The result of the process is an aqueous solution of the proteinaceous material which, after being dried, loses its soluble character and produces a water-insoluble film. The material is soluble while in aqueous form, but upon drying it is unable to take up water again. The solubility effect is irreversible. The step of drying changes a water-soluble material to a water-insoluble film, and if a plasticizer has been incorporated, as described above, to a water-insoluble flexible film. The product is useful either in its aqueous form, while soluble, or in its insoluble form as a film.

By dissolving the blood serum or egg protein in water or otherwise producing an aqueous solution in which the ethylene diamine, etc., is dispersed and then subjecting the solution to a temperature of about 150–200° F., an aqueous product solution is obtained which may be readily mixed with water-soluble paints or with other products requiring a water-soluble solution. The paint or other product, however, upon drying produces a water-insoluble film.

While in the foregoing specification we have set forth specific examples illustrating our new product and method, it will be understood that the details employed in such description may be varied widely by those skilled in the art and equivalent steps substituted for those set out without departing from the spirit of our invention.

We claim:

1. A process for producing a water-soluble composition which upon drying will form a water-insoluble film, which consists of reacting a protein material selected from the group consisting of blood protein and egg protein in an aqueous solution with a saturated aliphatic polyamine at a temperature between 150 and 200° F.

2. A process for producing a water-soluble composition which upon drying will form a water-insoluble film, which consists of reacting a protein material selected from the group consisting of blood protein and egg protein in an aqueous solution with ethylene diamine at a temperature between about 150 and 200° F.

3. A process for producing a water-soluble composition which upon drying will form a water-insoluble film, which consists of reacting a protein material selected from the group consisting of blood protein and egg protein in an aqueous solution with triethylene tetramine at a temperature between about 150 and 200° F.

4. A process for producing a water-soluble composition which upon drying will form a water-insoluble film, which consists of reacting blood serum in a water solution and at a temperature between 150 and 200° F. with ethylene diamine.

5. In a process for producing a water-insoluble composition which upon drying will form a water-insoluble film, the steps which consist of reacting blood serum in water solution at atmospheric pressure and at a temperature in the range of 150° to 200° F. with ethylene diamine.

6. In a process for producing a water-insoluble composition which upon drying will form a water-insoluble film, the steps which consist of reacting blood serum in water solution at a temperature of about 185° F. with ethylene diamine.

7. A water-soluble product produced in accordance with the process set out in claim 6.

8. A water-soluble product produced in accordance with the process set out in claim 1.

9. A water-soluble product produced in accordance with the process set out in claim 2.

EARL D. CORNWELL.
STEPHEN DOBIJA.

REFERENCES CITED

The following references are of record in the file of this patent:

UNITED STATES PATENTS

| Number | Name | Date |
| --- | --- | --- |
| 2,143,023 | Meigs | Jan. 10, 1939 |
| 2,318,046 | Beisworth | May 4, 1943 |